United States Patent [19]

Green et al.

[11] 3,929,990

[45] *Dec. 30, 1975

[54] MICROBIOCIDAL POLYMERIC QUATERNARY AMMONIUM COMPOUNDS

[75] Inventors: Harold A. Green, Havertown, Pa.; John J. Merianos, Jersey City; Alfonso N. Petrocci, Glen Rock, both of N.J.

[73] Assignee: Millmaster Onyx Corporation, New York, N.Y.

[ * ] Notice: The portion of the term of this patent subsequent to Jan. 1, 1992, has been disclaimed.

[22] Filed: Aug. 7, 1974

[21] Appl. No.: 495,328

Related U.S. Application Data

[63] Continuation-in-part of Ser. No. 425,931, Dec. 18, 1973, Pat. No. 3,874,870.

[52] U.S. Cl. .................. 424/78; 424/168; 424/325; 424/329
[51] Int. Cl.² ..................... A01N 9/20; A01N 9/24; A61K 15/00; A61K 17/00
[58] Field of Search ............. 424/78, 325, 329, 168; 260/87.5 R; 71/67

[56] References Cited
UNITED STATES PATENTS

| | | | |
|---|---|---|---|
| 3,140,976 | 7/1964 | Berenschot et al. | 424/329 |
| 3,539,684 | 11/1970 | Hoover | 424/78 |
| 3,771,989 | 11/1973 | Pera et al. | 424/329 |
| 3,778,283 | 12/1973 | Freyhold | 106/84 |

FOREIGN PATENTS OR APPLICATIONS
69/8949  7/1970  South Africa

*Primary Examiner*—Jerome D. Goldberg
*Assistant Examiner*—D. W. Robinson
*Attorney, Agent, or Firm*—Arthur A. Jacobs, Esq.

[57] ABSTRACT

Water-in-oil emulsions containing a polymeric quaternary ammonium compound prepared by the condensation of 1,4-dihalo-2-butene and 1,4-bis-dimethylamino-2-butene as a biocidal agent, and wherein the emulsifying agent is an amine oxide.

4 Claims, No Drawings

MICROBIOCIDAL POLYMERIC QUATERNARY AMMONIUM COMPOUNDS

This is a continuation-in-part of application Ser. No. 425,931, filed Dec. 18, 1973 issued as U.S. Pat. No. 3,874,870, dated Apr. 1, 1975.

This invention relates to water-in-oil emulsions which contain a polymeric quaternary ammonium compound as a microbiocidal agent, and it particularly relates to such emulsions wherein the emulsifying agent is an amine oxide.

The aforesaid application Ser. No. 425,931 disclosed that the polymeric quaternary ammonium compound formed by the condensation of 1,4-dihalo-2-butene and 1,4-bis-dimethylamine-2-butene comprises a very potent biocidal agent in oil-in-water emulsions and that such emulsions have relatively little foaming action. Furthermore, the polymeric quaternary ammonium compound does not have its biocidal effectiveness diminished in the presence of nonionic emulsifiers.

As disclosed in the aforesaid application Ser. No. 425,931, which is herewith incorporated by reference, the aforesaid polymeric quaternary ammonium compound is formed by mixing 1,4-dihalo-2-butene and 1,4-bis-dimethylamino-2-butene dissolved in a solvent, in relative molar proportions of between about 1:3 and about 3:1, at room temperature, whereby an exothermic reaction is obtained causing the temperature of the mixture to rise; then maintaining the mixture at no higher than reflux temperature until the reaction is complete.

This same polymeric quaternary ammonium compound provides the same satisfactory results when used in water-in-oil emulsions, except when such water-in-oil emulsions include non-ionic emulsifiers. When such non-ionic emulsifiers are present, biocidal effectiveness is seriously impaired. However, when the non-ionic emulsifier is replaced by an amine oxide as the emulsifying agent, the biocidal effectiveness is as satisfactory as when the composition is an oil-in-water emulsion.

In the same manner as the oil-in-water emulsions described in the aforesaid parent application, the compounds in the present water-in-oil emulsions are active at concentrations as low as 10 ppm against *Aerobacter aerogenes* and as low as 25 ppm against *Pseudomonas aeruginosa*, while against algae, such as *Chlorella pyrenoidosa*, they are active at a concentration at least as low as 1 ppm or lower. Insofar as concerns their upper limits, the concentration appears to be capable of being increased indefinitely without deleteriously affecting the biocidal activity.

Also, as in the case of the corresponding oil-in-water emulsions described in the aforesaid parent application, when used in cosmetic compositions the present water-in-oil emulsions are effectively protected by the polyquaternary compound at concentrations at least as low as about 500 ppm relative to the total composition, or perhaps even lower, although the preferred range is between about 1,000 to 2,000 ppm.

In order to show the highly significant differences in biocidal activity between water-in-oil emulsions, utilizing the present polymeric quaternary ammonium compound, wherein an amine oxide is used as the emulsifying agent and the same type of emulsion wherein non-ionic compounds are used as the emulsifying agent, a cosmetic-type water-in-oil emulsion was prepared using a water emulsion containing an amine oxide, namely "Ammonyx SO," as the emulsifier, and a similar emulsion was prepared using a combination of two commercially available non-ionic emulsifiers, namely "Arlacel 83" and "Span 80." The Arlacel 83 is a fatty acid partial ester of either polyglycols or polyglycol anhydrides, made by Atlas Powder Company, Wilmington, Del. and the Span 80 is a fatty acid partial ester of hexitol anhydride also made by Atlas Powder Company. Ammonyx SO is stearyldimethylamine-N-oxide made by the Onyx Chemical Company, Jersey City, N.J.

In preparation of the emulsion utilizing the non-ionic emulsifiers, the Arlacel 83 and Span 80 are heated together with lanolin, petrolatum and mineral oil to between 65° and 75°C, at which temperatures they form a homogeneous melt. The polymeric quaternary compound described above, namely, the condensation product of 1,4-dihalo-2-butene and 1,4-bis-dimethylamino-2-butene, which will be referred to as "Product A", is dissolved in water at between 65° and 75°C. Thereafter, with constant mechanical stirring, the aqueous phase is added very slowly to the oil phase and stirring is continued, while cooling, until a stable smooth emulsion results.

In the case of the emulsion formed with the amine oxide, the amine oxide, Ammonyx SO is dissolved in water, together with Product A, at 65° to 75°C. Then, the lanolin, petrolatum and mineral oil are heated to a homogeneous melt at between 65° to 75°C. Thereafter, with constant mechanical stirring, the aqueous phase is added very slowly to the oil phase and stirring is continued while cooling, until a stable smooth emulsion results.

The following examples illustrate the particular compositions used and the biocidal results achieved with each composition:

In the same manner as described in the parent application, 50 gm. samples of each composition were transferred aseptically to sterile 8 oz. wide-mouth jars. Two replicate jars were prepared in each instance including an untreated control. Each jar was inoculated to a concentration of $4.6 \times 10^6$ organisms ml. of jar content. The inoculation consisted of a sterile nutrient broth dilution of pooled 24-hour broth cultures of Pseudomonas aeruginosa, Escherichia coli, Enterobacter aerogenes, Proteus species and Bacillus species. Weekly bacterial counts were made for eight consecutive weeks. In the following Tables 1 and 2, the number of viable organisms per ml. after each weekly count is set forth. In this respect, Table 1 shows the results using the compositions of Example 1 and Table 2 shows results using the compositions of Example 2. One of the compositions of each example is a control while the other contains the polymeric quaternary ammonium compound.

If, after four weeks, the bacterial count of viable organisms was found to be fewer than 10 ml., the entire jar was reinoculated to a concentration of $5.9 \times 10^6$ organisms per ml. of jar content, and the weekly counts were then continued for four additional weeks. For testing purposes, $5.9 \times 10^6$ organisms per ml. is equivalent to 4.6 organisms per ml. since the test calls for inoculation or reinoculation at concentrations of $(1-10) \times 10^6$ organisms per ml.

| Components | Example 1 % by Weight | % by Weight |
|---|---|---|
| Lanolin, Anhydrous | 2.0 | 2.0 |

-continued

Example 1

| Components | % by Weight | % by Weight |
|---|---|---|
| Mineral Oil (65/75 visc.) | 40.0 | 40.0 |
| Petrolatum | 30.0 | 30.0 |
| Arlacel 83 | 3.0 | 3.0 |
| Span 80 | 2.0 | 2.0 |
| "Product A" | 0.0 | 0.2 (2000 ppm) |
| Water | 23.0 | 22.8 |

Table 1

| Week | | |
|---|---|---|
| 1 | $166 \times 10^6$ | $0.09 \times 10^6$ |
| 2 | $220 \times 10^6$ | $0.12 \times 10^6$ |
| 3 | $290 \times 10^6$ | $1.7 \times 10^6$ |
| 4 | $194 \times 10^6$ | $0.7 \times 10^6$ |
| 5 | $210 \times 10^6$ | $.85 \times 10^6$ |
| 6 | $310 \times 10^6$ | $22 \times 10^6$ |
| 7 | $420 \times 10^6$ | $180 \times 10^6$ |
| 8 | $290 \times 10^6$ | $34 \times 10^6$ |

Example 2

| Components | % by Weight | % by Weight |
|---|---|---|
| Lanolin, Anhydrous | 2.0 | 2.0 |
| Mineral Oil (65/75 visc.) | 40.0 | 40.0 |
| Petrolatum | 30.0 | 30.0 |
| Ammonyx SO | 4.0 | 4.0 |
| "Product A" | 0.0 | 0.2 (2000 ppm) |
| Water | 24.0 | 23.8 |

Table 2

| Week | | |
|---|---|---|
| 1 | $200 \times 10^6$ | 150 |
| 2 | $440 \times 10^6$ | 30 |
| 3 | $320 \times 10^6$ | <10 |
| 4 | $420 \times 10^6$ | <10 REINOCULATED |
| 5 | $580 \times 10^6$ | <10 |
| 6 | $420 \times 10^6$ | <10 |
| 7 | $340 \times 10^6$ | <10 |
| 8 | $520 \times 10^6$ | <10 |

The biocidal test results displayed in Tables 1 and 2 clearly indicate that the polyquaternary compound cannot function as an effective biocide in water-in-oil emulsions when it is in a system which is emulsified by non-ionic emulsifiers. On the other hand, the biocidal test results displayed in Table 2 show that the polyquaternary compound (Product A) is an effective biocide in water-in-oil emulsion systems in which surface-active amine oxides are used as emulsifiers.

The invention claimed is:

1. A method of controlling the proliferation of bacteria and algae in a water-in-oil emulsion which comprises incorporating into said emulsion a condensation product as an antimicrobial agent and an amine oxide as an emulsifier, said condensation product being formed by mixing 1,4-dihalo-2-butene and 1,4-bis-dimethylamino-2-butene dissolved in a solvent at room temperature whereby an exothermic reaction is obtained causing the temperature of the mixture to rise, then maintaining the mixture at no higher than reflux temperature until the reaction is complete, the reactants being present in the reaction in relative molar proportions to each other of between about 1:3 and about 3:1, said condensation product being present in the emulsion in a bactericidally and algicidally effective amount, and said amine oxide being present in an amount effective to emulsify the composition.

2. The method of claim 1 wherein said amine oxide is a higher alkyl dimethylamine oxide.

3. The method of claim 1 wherein said amine oxide is stearyldimethylamine-N-oxide.

4. The method of claim 1 wherein the dihalo is selected from the group consisting of dichloro and dibromo.

* * * * *